US012636526B1

(12) United States Patent
Brown et al.

(10) Patent No.: US 12,636,526 B1
(45) Date of Patent: May 26, 2026

(54) SAFETY VEST

(71) Applicants: Nathaniel Brown, Indian Head, MD (US); Julie Hawkins-Ennis, Indian Head, MD (US)

(72) Inventors: Nathaniel Brown, Indian Head, MD (US); Julie Hawkins-Ennis, Indian Head, MD (US)

( * ) Notice: Subject to any disclaimer, the term of this patent is extended or adjusted under 35 U.S.C. 154(b) by 1043 days.

(21) Appl. No.: 17/725,657

(22) Filed: Apr. 21, 2022

(51) Int. Cl.
| | |
|---|---|
| B60R 22/14 | (2006.01) |
| A62B 35/00 | (2006.01) |
| B60R 21/00 | (2006.01) |
| B60R 22/24 | (2006.01) |

(52) U.S. Cl.
CPC .............. *A62B 35/00* (2013.01); *B60R 21/00* (2013.01); *B60R 22/14* (2013.01); *B60R 22/24* (2013.01); *B60R 2021/0037* (2013.01)

(58) Field of Classification Search
CPC ............................ A41D 13/0007; A62B 35/00
See application file for complete search history.

(56) References Cited

U.S. PATENT DOCUMENTS

| | | | | |
|---|---|---|---|---|
| 1,955,473 | A * | 4/1934 | Raymer ................. | A62B 35/04 |
| | | | | 188/34 |
| 4,595,078 | A * | 6/1986 | Greenway .............. | A63B 27/00 |
| | | | | 182/9 |
| 5,033,460 | A * | 7/1991 | Goldish ............... | A61H 1/0218 |
| | | | | 606/241 |

| | | | | |
|---|---|---|---|---|
| 6,101,631 | A * | 8/2000 | Ferguson, Jr. ..... | A41D 13/0007 |
| | | | | 2/108 |
| 6,305,024 | B1 | 10/2001 | Schweer | |
| 6,637,377 | B2 | 10/2003 | Lobanoff et al. | |
| 6,892,395 | B2 * | 5/2005 | Schweer ............ | A41D 13/0007 |
| | | | | 2/69 |
| 2007/0193824 | A1 * | 8/2007 | Anderson ................. | E06C 9/02 |
| | | | | 182/8 |
| 2012/0247869 | A1 * | 10/2012 | Anderson ............... | E06C 7/187 |
| | | | | 182/8 |
| 2013/0306824 | A1 * | 11/2013 | Miller ................ | A41D 13/0002 |
| | | | | 248/342 |
| 2015/0060195 | A1 * | 3/2015 | Sharp ................. | A62B 35/0031 |
| | | | | 182/3 |
| 2023/0083215 | A1 * | 3/2023 | Cowell .............. | A62B 35/0012 |
| | | | | 182/6 |

FOREIGN PATENT DOCUMENTS

| | | | | | |
|---|---|---|---|---|---|
| GB | | 2406078 | A9 * | 3/2005 | ............... B60N 2/90 |
| GB | | 2578643 | A * | 5/2020 | ............ E06C 7/187 |
| PL | | 246649 | B1 * | 2/2025 | ............ B60R 22/14 |
| WO | WO-2008094280 | A2 * | 8/2008 | ............... F41H 1/02 | |
| WO | WO-2025137464 | A1 * | 6/2025 | | |

* cited by examiner

*Primary Examiner* — Nicole T Verley
(74) *Attorney, Agent, or Firm* — Sanchelima & Associates, P.A.; Christian Sanchelima; Jesus Sanchelima

(57) ABSTRACT

A safety vest including a vest assembly, an attaching assembly, and a chain assembly. The vest assembly includes a vest. The attaching assembly includes an attaching portion. The attaching portion is attached to the vest. The chain assembly includes a chain, a first hook and a second hook. The first and second hook are attached to the ends of the chain. The first hook is secured to the attaching members. The second hook is secured to a trash truck to secure a user to the trash truck avoiding a person from falling of the trash truck.

2 Claims, 5 Drawing Sheets

10

SAFETY VEST

BACKGROUND OF THE INVENTION

1. Field of the Invention

The present invention relates to a safety vest and, more particularly, to a safety vest that can be secured to a trash truck by means of a chain.

2. Description of the Related Art

Several designs for a safety vest have been designed in the past. None of them, however, include a vest that is adjustable for different sizes of users.

Applicant believes that a related reference corresponds to U.S. Pat. No. 6,637,377 issued for an animal restrain vest with a tether that allows it to be coupled to a vehicle. Applicant believes that another related reference corresponds to U.S. Pat. No. 6,305,024 issued for a safety harness with an attachment ring adapted to receive a rope or line. None of these references, however, teach of a safety vest for workers on refuse truck that is comprised of a body worn vest with a chain tether and hook assembly that allows a worker to be releasably coupled to the back of a refuse truck.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a safety vest that includes a chain to secure a user to a trash truck.

It is another object of this invention to provide a safety vest that can be easily put on or take off.

It is still another object of the present invention to provide a safety vest that includes an adjusting element to fit different sizes of users.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
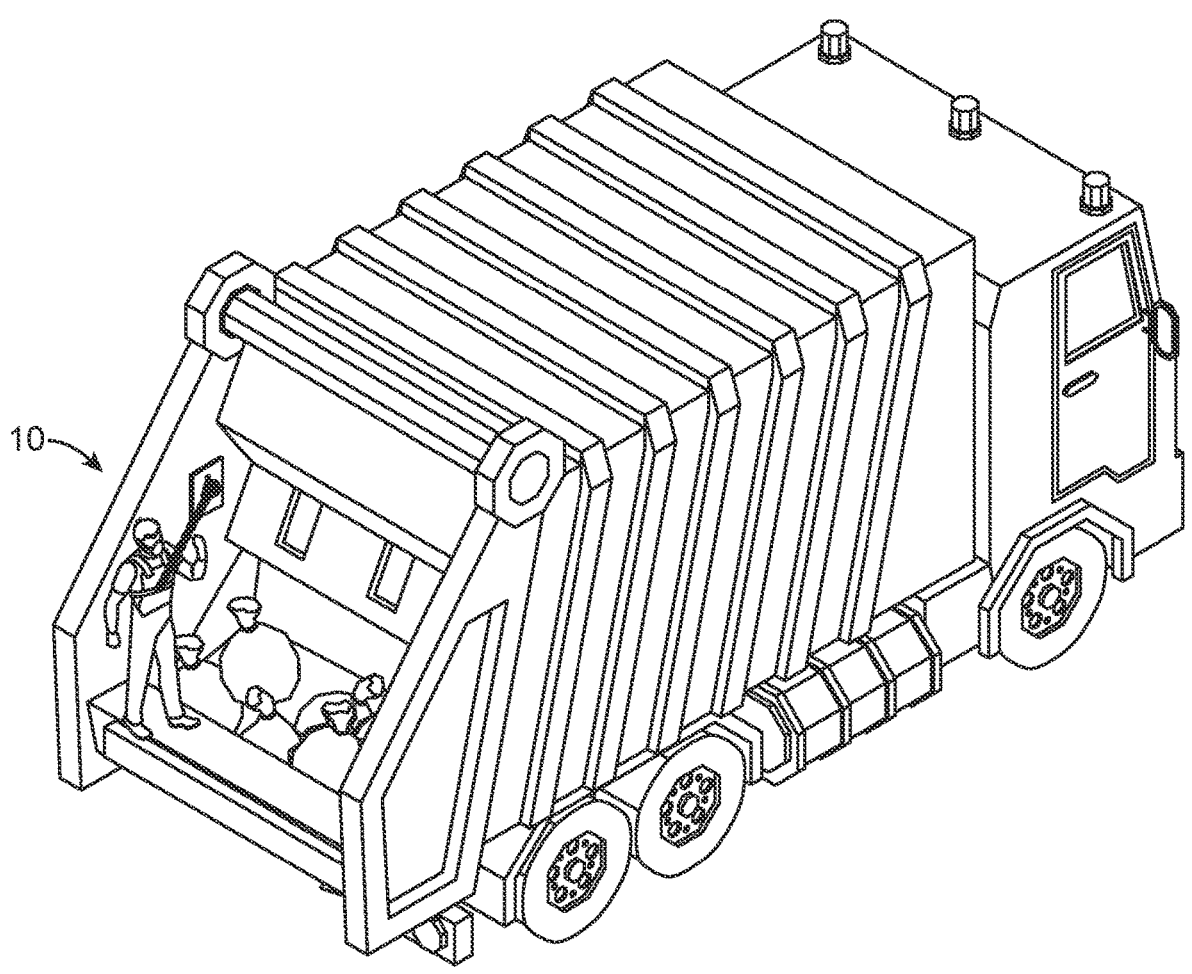
FIG. 1 represents an isometric operational view of present invention 10 wherein a user is securing to a trash truck.
Figure 2:
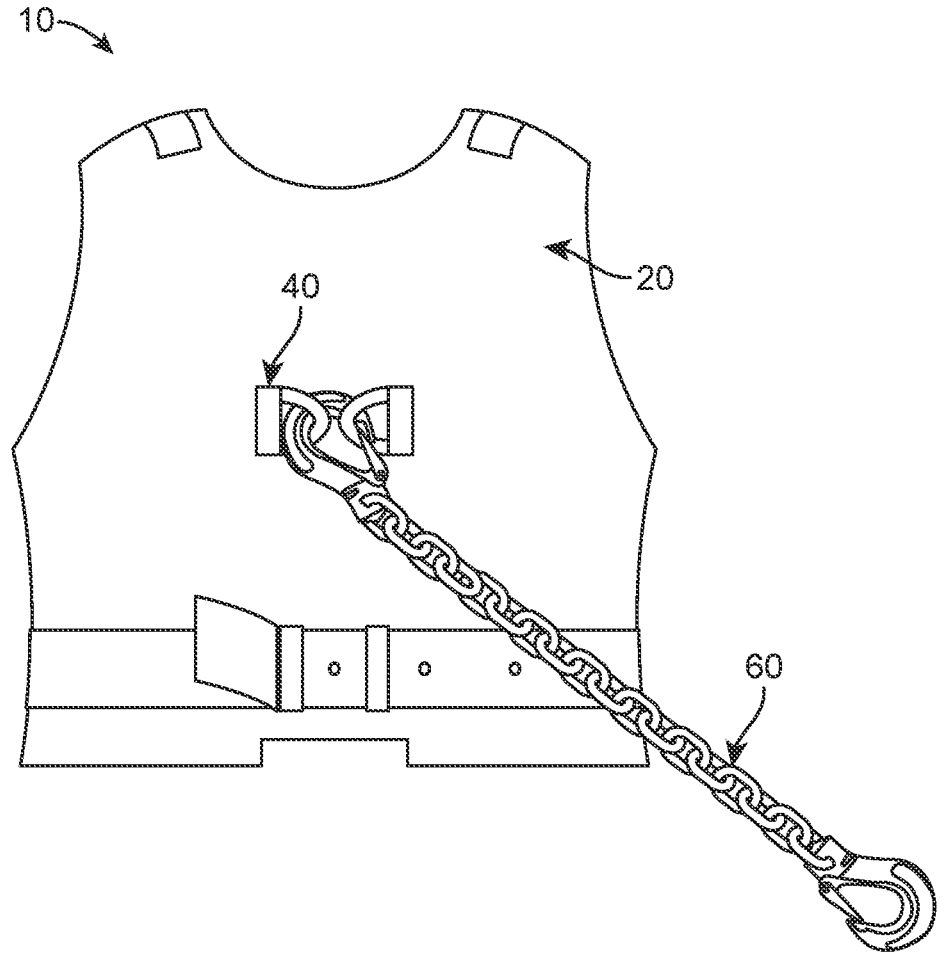
FIG. 2 shows an isometric view of present invention 10 including a vest assembly 20, an attaching assembly 40, and a chain assembly 60.
Figure 3:
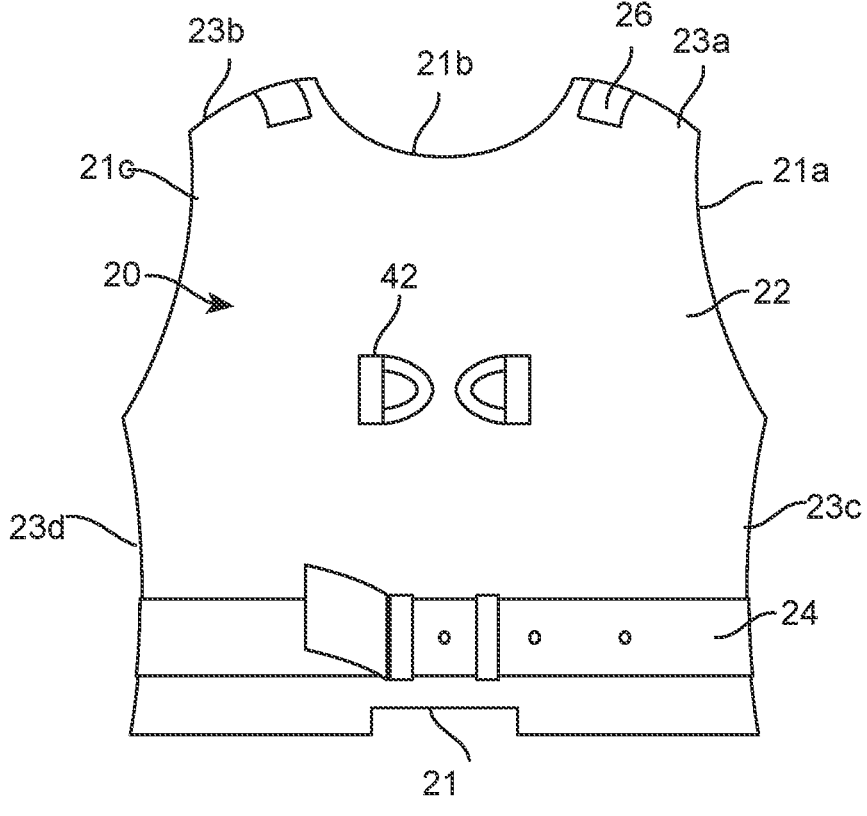
FIG. 3 illustrates an enlarged front view of vest assembly 20 including a front portion 22, adjusting elements 26, a belt 24 and the attaching portion 42.
Figure 4:
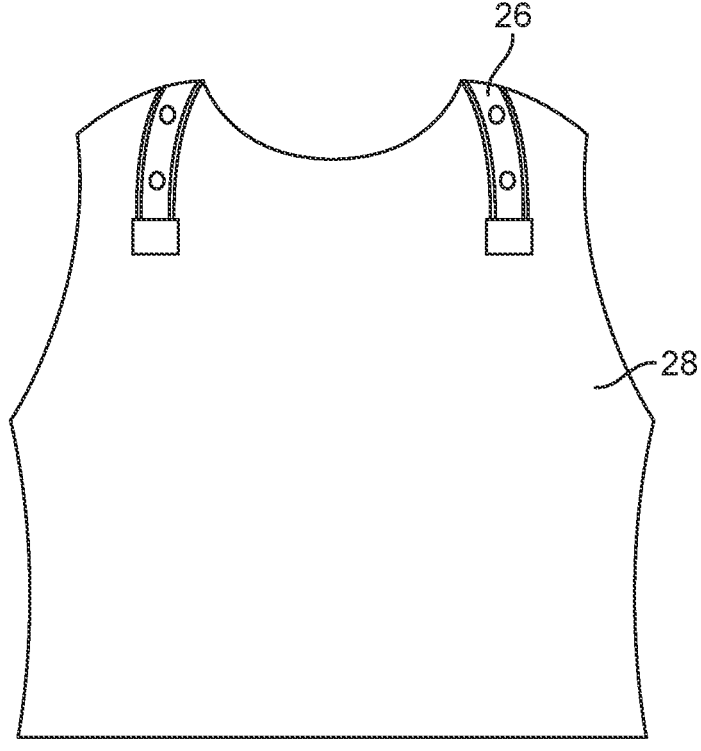
FIG. 4 is a representation of an enlarged rear view of vest assembly 20 including a rear portion 28 and adjusting elements 26.

Referring now to the drawings, where the present invention is generally referred to with numeral 10, it can be observed that it basically includes a vest assembly 20, attaching assembly 40 and a chain assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The vest assembly 20 includes a front portion 22, a belt 24, adjusting elements 26 and a rear portion 28. The front portion 22 may have an upper portion, a lower portion, and a central portion. The lower portion of the front portion 22 may have a curved shape. It also may be suitable for the lower portion of the front portion 22 to have a straight shape or any other suitable shape. The upper portion of the front portion 22 may have a curved shape. The upper portion of the front portion 22 may go inwards to define a curved shape to accommodate an arm of a user. The upper portion of the front portion 22 may have a semicircular shape. The front portion 22 and the rear portion 28 may be attached by the edges 23a, 23b, 23c and 23d to define a vest that includes a first opening 21, a second opening 21a, a third opening 21b and a fourth opening 21c. The second opening 21a and the fourth opening 21c may be opposite one to the other. The third opening 21b and the first opening 21 may be diametrically opposed one to each other. The first opening 21 may be the bottommost end of the vest assembly 20.

In a preferred embodiment a user may introduce the vest assembly through the first opening 21. In a preferred embodiment the arms of a user may go through the second opening 21a and the fourth opening 21c. In a preferred embodiment the head of the user may go through the third opening 21b. Thus, the vest assembly 20 may be used as a vest. A vest is known in the prior art to be a close-fitting, waist-length, sleeveless garment The front portion 22 and the rear portion 28 may be made of Kevlar, carbon nanotube, aramid, cloth, or any other material known in the prior art. The belt 24 may horizontally surround the front portion 22 and the rear portion 28. The belt 24 may be a rectangular enlarged piece of cloth that helps to fix the vest assembly 20 to a user. The belt 24 may be made of cloth, plastic, Kevlar, or any other resistant material. A belt is known in the prior art as a strip of leather or other material worn around the waist or across the chest to support clothes. The adjusting elements may be located on the edges 23a and 23b. The adjusting elements 26 may connect the front portion 22 of the best and the rear portion 28. The adjusting elements 26 may increase or decrease the depth of the union of the edges 23a and 23b with the rear portion 28. The adjusting elements 26 may be made of cloth, denim, leather, or any other suitable material.

The attaching assembly 40 may include an attaching portion 42. In a preferred embodiment the attaching portion 42 may be two semicircular rings. It also may be suitable for the attaching portion 42 to have any other configuration that allows a hook to be attached to the attaching portion 42. One of the ends of the semicircular rings of the attaching portion 42 may be attached to a central portion of the front portion 22 of the vest assembly 20. It also may be suitable for the attaching portion 42 to have any other configuration in the front portion 22 of the vest assembly 20. The other ends of the semicircular rings of the attaching portion 42 may be fixed to the chain assembly 60. In a preferred embodiment the attaching portion 42 is made of metal. It also may be suitable for the attaching portion 42 to be made of plastic, wood, or any other resistant material. It should be understood that the vest assembly 20 and the attaching assembly 40 may have modifications to be attached one to the other.

Figure 5:
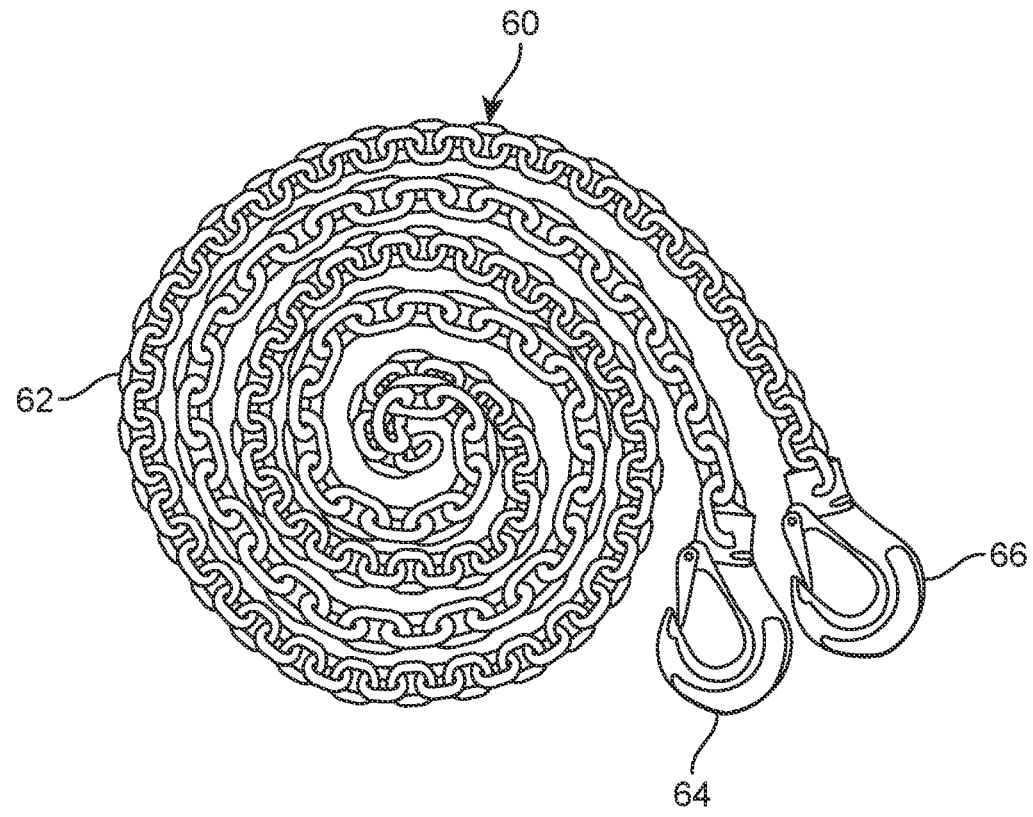
FIG. 5 illustrates an isometric view of chain assembly 60 including a chain 62, a first hook 64, and a second hook 66.

The chain assembly 60 may include a chain 62, a first hook 64 and a second hook 66 as shown in FIG. 5. In a preferred embodiment the chain 62 is a chain with oval links. It also may be suitable for the chain 62 to be a chain with square link, a closed joint chain, a brush roller chain, or the like. In a preferred embodiment the chain 62 may be made of metal. It also may be suitable for the chain 62 to be made of plastic, wood, or any other resistant material. The chain 62 may have distal ends. The first hook 64 may be attached to a distal end of the chain 62. The second hook 66 may be attached to another distal of the chain 62.

The first hook 64 and the second hook 66 may have a curved shape. In a preferred embodiment the first hook 64 and the second hook 66 are clevis hooks. It also may be suitable for the first hook 64 and the second 66 to be an eye hook, a swivel hook or any other suitable hook known in the prior art. In a preferred embodiment the first hook 64 may be configurated to be secured to the attaching portion 42. In a preferred embodiment the second hook 66 may be secured to a bar of a trash truck. It also may be suitable for the second hook 66 to be secured to any element of a trash truck. In a preferred embodiment a user may wear the safety vest 20 and gets attached to a trash truck by means of the chain assembly to avoid the user from falling.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A safety vest, comprising:

a vest assembly including a vest, a front portion, a rear portion, and a belt; wherein said front portion has an upper portion with a curved shape that defines a neck opening, said upper portion curves inward to accommodate arms of a user, said front portion has a lower portion with a curved shape, said front portion and said rear portion are attached by edges to define a first opening at a bottommost end of said vest assembly, a second opening and a fourth opening that are opposite one to the other for receiving arms of the user, and a third opening for receiving a head of the user, wherein said third opening and said first opening are diametrically opposed to each other, said belt horizontally surrounds said front portion and said rear portion and is capable of adjusting the width of said vest;

an attaching assembly including an attaching portion, wherein said attaching portion is attached to a central portion of said front portion of said vest; said attaching portion comprises two semicircular rings, wherein one end of each semicircular ring is attached to said central portion of said front portion and another end of each semicircular ring is configured to be fixed to a chain assembly; and the chain assembly including a chain, a first hook and a second hook, wherein said first hook is attached to an end of said chain, said second hook is attached to another end of said chain, said first hook is secured to said attaching portion and said second hook is configured to be secured to a trash truck to avoid a person from falling from said trash truck, said first hook and said second hook are clevis hooks, said chain comprises oval links and is made of metal.

2. A safety vest, consisting of:

a vest assembly including a vest, adjusting elements and a belt, the vest has a front portion and a rear portion; said front portion has an upper portion with a curved shape that defines a neck opening, said upper portion curves inward to accommodate arms of a user, said front portion has a lower portion with a curved shape, said front portion and said rear portion are attached by edges comprising a first edge, a second edge, a third edge, and a fourth edge to define a first opening at a bottommost end of said vest assembly, a second opening and a fourth opening that are opposite one to the other for receiving arms of the user, and a third opening for receiving a head of the user, wherein said third opening and said first opening are diametrically opposed to each other: the adjusting elements are located on said first edge and said second edge of said vest to connect said front portion and said rear portion and to adjust the length of an upper portion of said vest, said belt horizontally surrounds said front portion and said rear portion and is capable of adjusting the width of said vest;

an attaching assembly including an attaching portion, wherein said attaching portion is attached to a central portion of said front portion of said vest, said attaching portion consists of two semicircular rings, wherein one end of each semicircular ring is attached to said central portion of said front portion and another end of each semicircular ring is fixed to a chain assembly, said attaching portion is made of metal; and a chain assembly including a chain, a first hook and a second hook, wherein said first hook is attached to an end of said chain, said second hook is attached to another end of said chain, said first hook is secured to said attaching portion and said second hook is configured to be secured to a trash truck to avoid a person from falling from said trash truck, said first hook and said second hook are clevis hooks, said chain comprises oval links and is made of metal.

* * * * *